US007155802B2

(12) United States Patent
Cronk

(10) Patent No.: US 7,155,802 B2
(45) Date of Patent: Jan. 2, 2007

(54) LIFT TOOL

(76) Inventor: David W. Cronk, P.O. Box 209, Torrington, WY (US) 82240

( * ) Notice: Subject to any disclaimer, the term of this patent is extended or adjusted under 35 U.S.C. 154(b) by 0 days.

(21) Appl. No.: 11/235,304

(22) Filed: Sep. 26, 2005

(65) Prior Publication Data

US 2006/0016062 A1 Jan. 26, 2006

Related U.S. Application Data

(62) Division of application No. 10/694,160, filed on Oct. 27, 2003, now Pat. No. 7,020,943.

(60) Provisional application No. 60/422,800, filed on Oct. 31, 2002.

(51) Int. Cl.
*B25B 27/14* (2006.01)
*B23Q 7/00* (2006.01)

(52) U.S. Cl. ............................ 29/559; 29/252; 29/278

(58) Field of Classification Search .................. 29/468, 29/252, 259, 261, 278, 270; 254/49, 122
See application file for complete search history.

(56) References Cited

U.S. PATENT DOCUMENTS

| | | | | |
|---|---|---|---|---|
| 4,544,134 | A * | 10/1985 | Mitchell | 254/93 R |
| 5,325,576 | A * | 7/1994 | Henderson | 29/426.5 |
| 6,463,643 | B1 * | 10/2002 | Behling | 29/252 |
| 7,020,943 | B1 * | 4/2006 | Cronk | 29/252 |
| 2004/0084916 | A1 * | 5/2004 | Cronk | 294/67.1 |
| 2006/0016062 | A1 * | 1/2006 | Cronk | 29/468 |

* cited by examiner

*Primary Examiner*—Lee D. Wilson
(74) *Attorney, Agent, or Firm*—Dean P. Edmundson

(57) ABSTRACT

A lift tool and method useful for installing a repaired clutch assembly or flywheel in a vehicle bell housing. The tool includes (a) a mounting bracket which can be secured to existing threaded openings in the bell housing, (b) an elongated lift arm pivotably attached to the mounting bracket, (c) a rail supported by the elongated arm, (d) a hook carried by the rail and being moveable along the rail, (e) a hanger bracket which is connected to the hook and which is able to support the clutch assembly or flywheel, and (f) power source for selectively raising or lowering the elongated arm. With proper safety precautions, the lift tool can also be used in the removal of a clutch assembly or flywheel from a bell housing.

1 Claim, 6 Drawing Sheets

LIFT TOOL

CROSS-REFERENCE TO RELATED APPLICATION

This application is a divisional of my parent application Ser. No. 10/694,160, filed Oct. 27, 2003 now U.S. Pat. No. 7,020,943, which is based on, and claims priority from, my Provisional Application Ser. No. 60/422,800, filed Oct. 31, 2002.

FIELD OF THE INVENTION

This invention relates to tools and methods for installing clutch assemblies and flywheels in vehicles, e.g. trucks. More particularly, it relates to tools and methods for installing clutch assemblies and flywheels more efficiently than previously possible.

BACKGROUND OF THE INVENTION

Clutch assemblies and flywheels used in large trucks are quite heavy and bulky. Periodically it is necessary to remove a clutch assembly from the flywheel for repair or replacement. Sometimes it is also necessary to remove the flywheel for repair or replacement. To perform either of these tasks, it is first necessary to disconnect the transmission from the bell housing surrounding the flywheel and clutch assembly. Then the transmission, being supported on a jack, must be moved rearwardly several inches.

The clutch assembly is typically quite heavy (e.g. about 165 pounds) and may be over 17 inches in diameter. It includes four pieces which must be maintained in proper alignment. The flywheel is also quite heavy.

Although it is possible to support the clutch assembly, or the flywheel, in a vertical position on a floor jack after it is removed from the bell housing, this is not convenient. Further, because of the large size of the clutch assembly, it is not possible to move the clutch assembly from beneath the truck in a vertical position without first removing surrounding items from the truck itself (e.g. fuel tank, steps, etc.). This requires more labor and time. Although the truck could be raised and supported on a lift, not all repair shops have a lift for trucks.

There has not heretofore been provided a tool or method for removing or installing a clutch assembly, or a flywheel, having the advantages provided by the present invention.

SUMMARY OF THE INVENTION

In accordance with the present invention there is provided a lift tool which enables a workman to remove or install a clutch assembly, or a flywheel, without putting the truck on a lift, and without having to remove fuel tanks, steps, etc. from the truck itself.

In a preferred embodiment, the lift tool comprises:

(a) a mounting bracket which is capable of being secured to the bell housing;

(b) an elongated arm having inner and outer ends; wherein the inner end is pivotably attached to the mounting bracket;

(c) an elongated rail member supported by the outer end of the elongated arm;

(d) a hook member which is carried by the rail member and is moveable along the rail member;

(e) a hanger bracket which is detachably connected to the hook member; wherein the hanger bracket is adapted to support the clutch assembly or flywheel; and (f) power means for selectively raising and lowering the outer end of the elongated arm.

The lift tool of this invention is intended primarily for use in installing a clutch assembly, or a flywheel, in a bell housing of a vehicle. With proper safety precautions, the lift tool can also be used in the removal of a clutch assembly or flywheel from a bell housing. After the transmission has been detached from the bell housing and moved rearwardly, the mounting bracket can be secured to the bell housing (e.g. by means of bolts which extend through openings in the mounting bracket and are threaded into existing threaded openings in the bell housing). Then the hanger bracket slidably engages the clutch assembly or flywheel. After the clutch assembly has been loosened from the flywheel, the weight of the clutch assembly can be supported on the hanger bracket. The hook member, hanger bracket and clutch assembly are then moved rearwardly to free the clutch assembly from the bell housing. The outer end of the elongated arm is then lowered to thereby lower the clutch assembly to the floor. After the hanger bracket and clutch assembly have been lowered, the hanger bracket can be detached from the hook. Then the clutch assembly can be tilted to a horizontal position to enable it to be removed from beneath the truck without having to remove fuel tanks, steps, etc. from the truck or vehicle. A similar procedure can be used to remove the flywheel from the bell housing.

After necessary repairs have been made to the clutch assembly or flywheel, it can be moved under the truck in a horizontal position and then tilted upwardly to a vertical position. This enables the hanger bracket to be connected to the hook member and then raised by the elongated lift arm to the proper position for insertion of the clutch assembly (or flywheel) into the bell housing where the clutch assembly can be secured to the flywheel.

Other features and advantages of the lift tool of the invention will be apparent from the following detailed description and accompanying drawings.

DETAILED DESCRIPTION OF THE INVENTION

Figure 1:
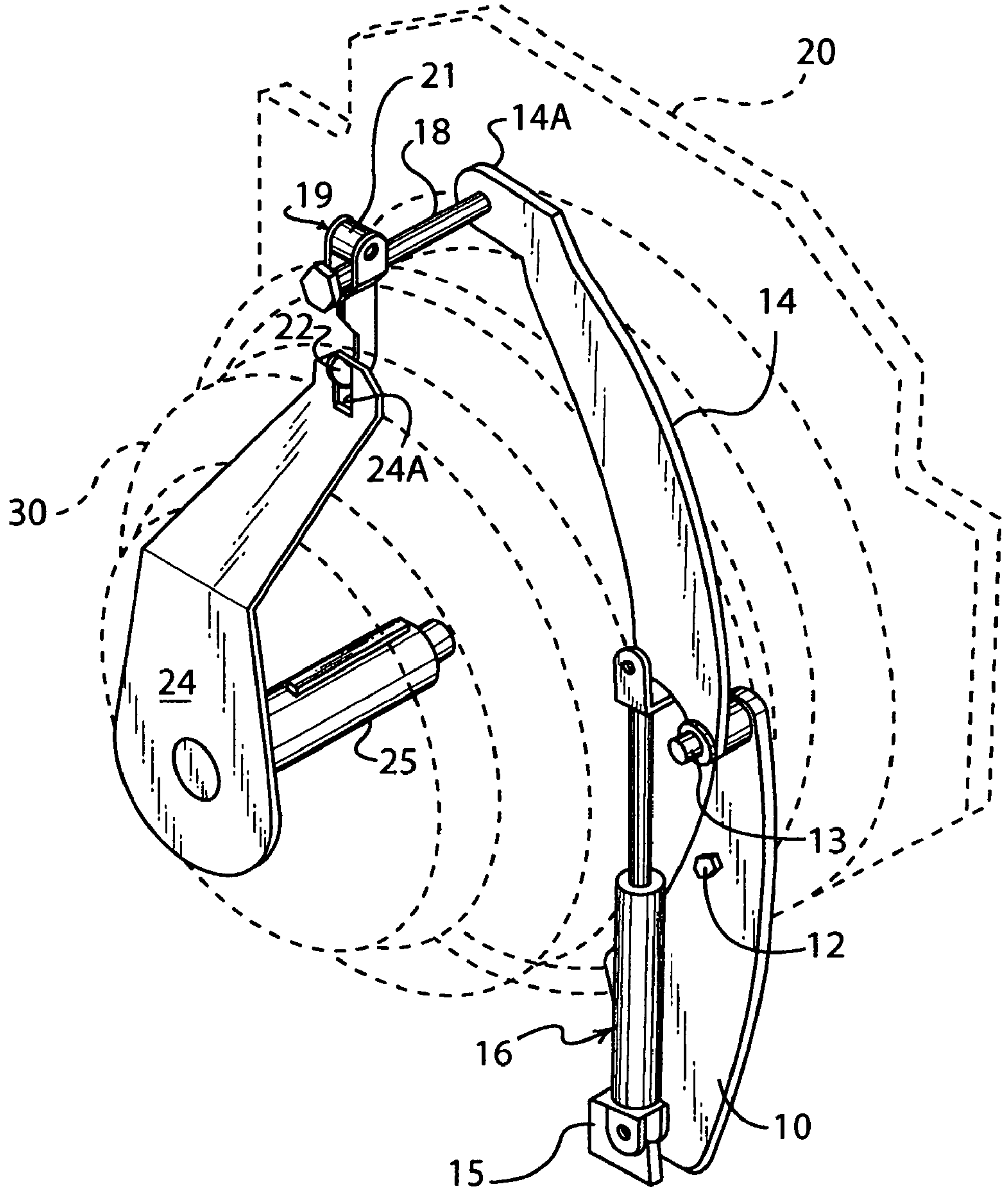
FIG. 1 is a perspective view of the lift tool of the invention attached to a vehicle bell housing and supporting a clutch assembly for removal from, or insertion into, the bell housing.
Figure 2:
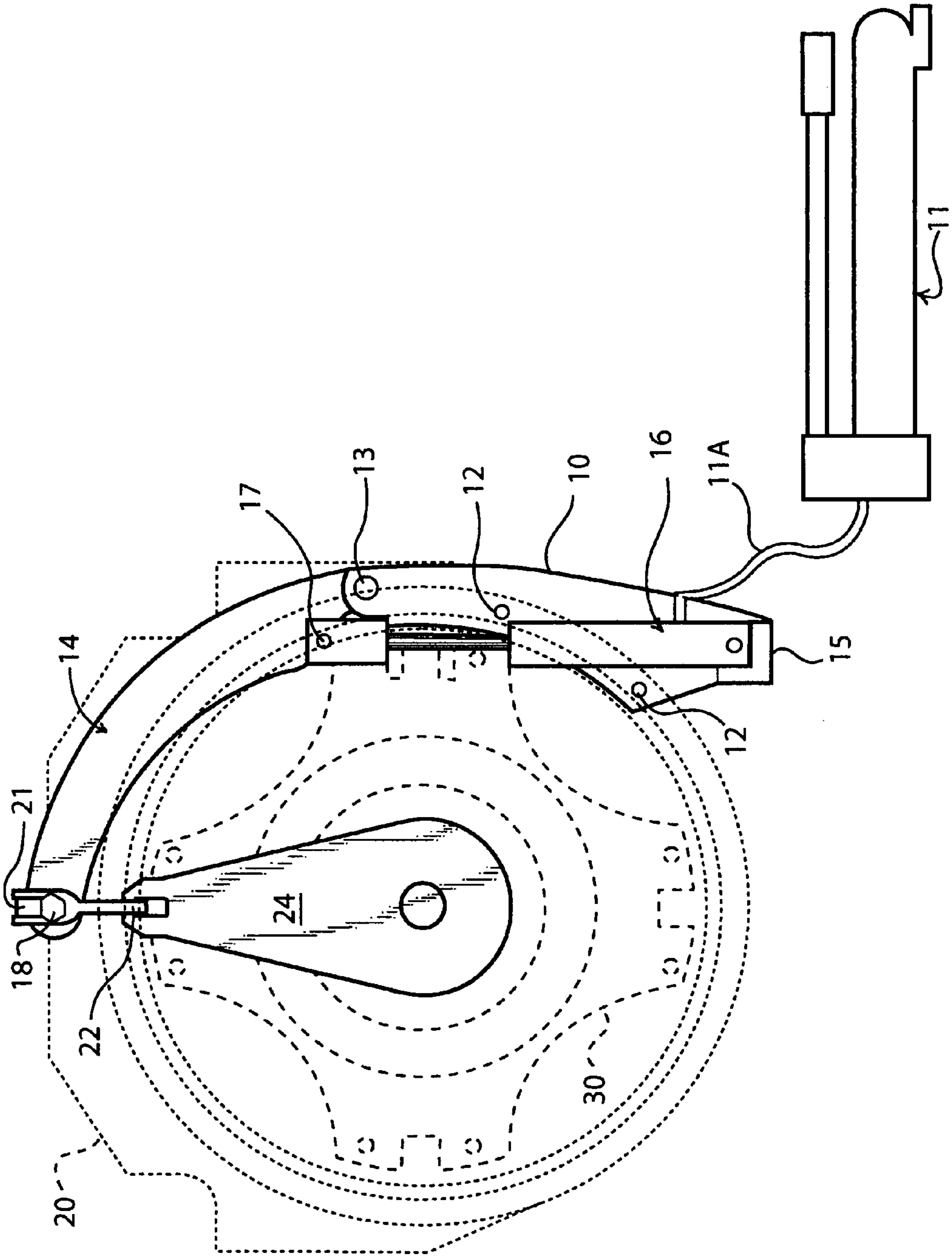
FIG. 2 is a front elevational view of the lift tool, the clutch assembly, and the bell housing shown in FIG. 1.
Figure 3:
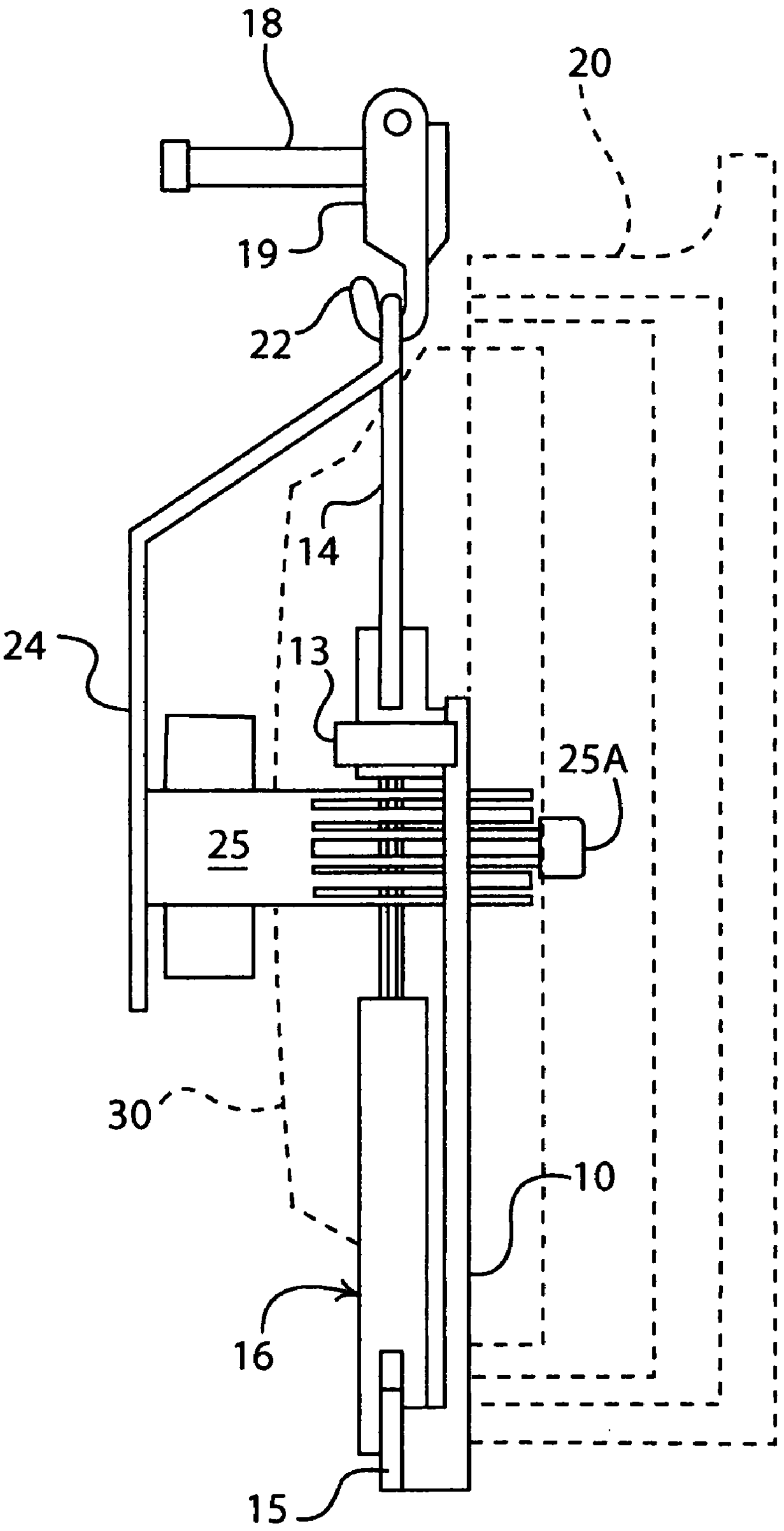
FIG. 3 is a side elevational view of the lift tool system shown in FIG. 1.

As shown in the drawings, the lift tool of the invention comprises a mounting bracket 10 which can be secured to existing threaded holes in the vehicle bell housing 20 by means of multiple threaded bolts (e.g. two bolts). One such bolt 12 is shown in FIG. 1. The mounting bracket shown is intended for mounting on one side of the bell housing, but a mounting bracket could be made to mount on the opposite side of the bell housing, if desired. An elongated lift arm 14 is pivotably attached at its inner end to the mounting bracket by means of a pivot pin 13, as shown.

To the outer end 14A of the elongated lift arm there is secured an elongated slide rail 18. Preferably the pivot pin 13 is parallel to the longitudinal central axis of the clutch assembly 30, and preferably the slide rail is perpendicular to the elongated arm (and parallel to the longitudinal central axis of the clutch assembly).

Carried by the slide rail 18 is a slide hook assembly 19 with roller 21 which is moveable along the length of the slide rail (but the outer end of the rail is enlarged to prevent the slide hook from coming off the outer end). The hook assembly includes an upturned hook 22, as shown. Detachably connected to the hook 22 is a hanger bracket 24. Preferably the hanger bracket includes an alignment tool (e.g. a splined shaft 25) which is perpendicular to the hanger bracket, as shown and illustrated in the drawings. The alignment tool can be slidably inserted into a complementary shaped central opening in the clutch assembly 30. The alignment tool is used to hold the parts of the clutch assembly in proper alignment while it is being installed (or removed). The top of the hanger bracket includes a slot 24A where the slide hook is attached to allow safe lifting of the hanger bracket and clutch assembly. The alignment tool includes a splined shaft 25 with a protruding outer end 25A. The splines maintain clutch plate alignment with each other. The protruding end is made to fit into the pilot bearing of the vehicle flywheel. Together the splines and protruding end of the shaft allow for much easier insertion of the clutch assembly to the flywheel.

In order to pivot the upper end of the lift arm 14 upwardly and downwardly, as desired, a hydraulic or electrically powered cylinder 16 (e.g. 12 volt or 110 volt power) can be connected between the mounting bracket 10 and the elongated lift arm 14. In one embodiment, the bracket 10 includes an attachment plate 15 to which the lower end of the power cylinder 16 can be attached with a pin. The upper end of the cylinder can be attached to the lift arm 14 by means of a pin 17, as shown. In one embodiment, the cylinder can be powered by a hand-operated hydraulic pump 11 (connected to the cylinder with a hydraulic hose 11A). In another embodiment, an electric motor could be used to power a hydraulic cylinder or a rotatable threaded shaft to move the lift arm upwardly and downwardly. In yet another embodiment, a pneumatic cylinder could be used.

The lift tool of the invention can be used to easily install clutch assemblies in a variety of vehicles. It is especially useful when installing clutch assemblies in large trucks. With proper safety precautions, the lift tool can also be used when removing a clutch assembly from the bell housing. The lift tool can also be used to install a flywheel in a bell housing.

With the vehicle's transmission loosened and moved rearwardly away from the bell housing, the mounting bracket can be bolted to the bell housing at two or more hole locations. The hanger bracket can then be connected to the hook carried on the slide rail. Preferably a clutch alignment tool (e.g. a splined shaft) is carried by the hanger bracket. The clutch alignment tool can be slidingly inserted into the central opening in the clutch assembly, after which the clutch assembly can be detached from the engine flywheel. Preferably slight upward pressure is applied to the elongated arm so that the arm will support the weight of the clutch assembly after being disconnected from the flywheel.

The clutch assembly, hanger bracket and slide hook can be moved rearwardly on the slide rail. Then the arm can be lowered so as to lower the clutch assembly to the floor, after which the hanger bracket can be detached from the hook. The clutch assembly can then be tilted to a horizontal position and slid out from under the vehicle without having to disconnect the fuel tanks, steps, or anything else from the vehicle.

To install the repaired clutch assembly to the vehicle, the clutch assembly is first placed on the hanger bracket and then slid under the vehicle where the clutch assembly can be tilted to a vertical position. The hanger bracket is then connected to the slide hook, after which the elongated arm is raised (e.g. by means of the hydraulic or electric cylinder shown in the drawings). Then the hanger bracket, clutch assembly and slide hook can be slid along the slide rail toward the bell housing. The outer end of the clutch alignment tool (e.g. the splined shaft) will slide into the pilot bearing of the flywheel. Then the clutch assembly will slide into the bell housing and into contact with the engine flywheel. The clutch mounting bolts can then be inserted and tightened, after which the hanger bracket can be detached from the hook. The lift tool can then be removed from the bell housing. After removal, the tool can slide out from under the vehicle.

Figure 4:
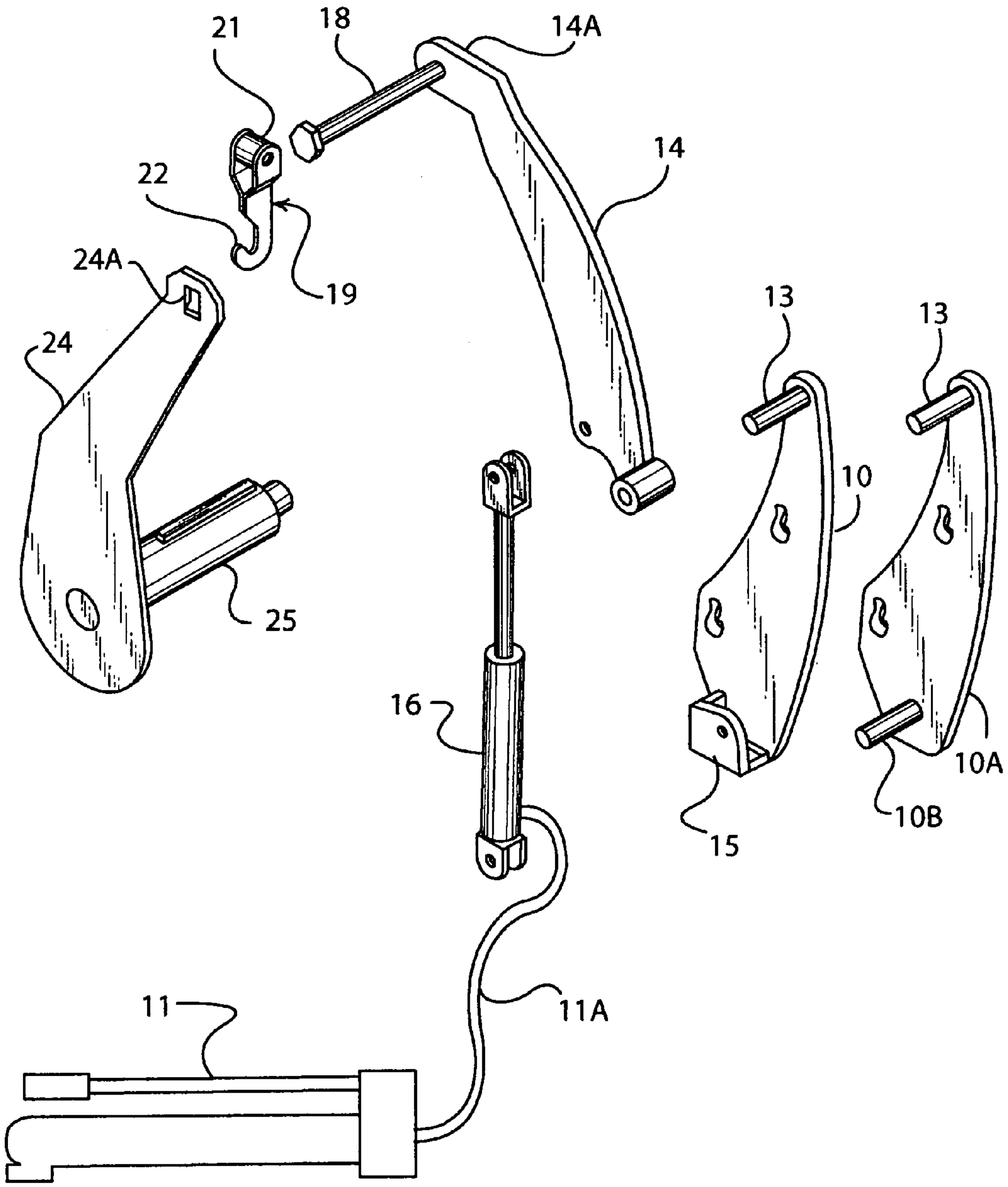
FIG. 4 is an exploded view of the lift tool of the invention.

FIG. 4 is an exploded view showing the components of the lift tool system. An optional mounting bracket 10A is also shown which includes a pin 10B at its lower end for connecting and supporting the lower end of the power cylinder.

Figure 5:
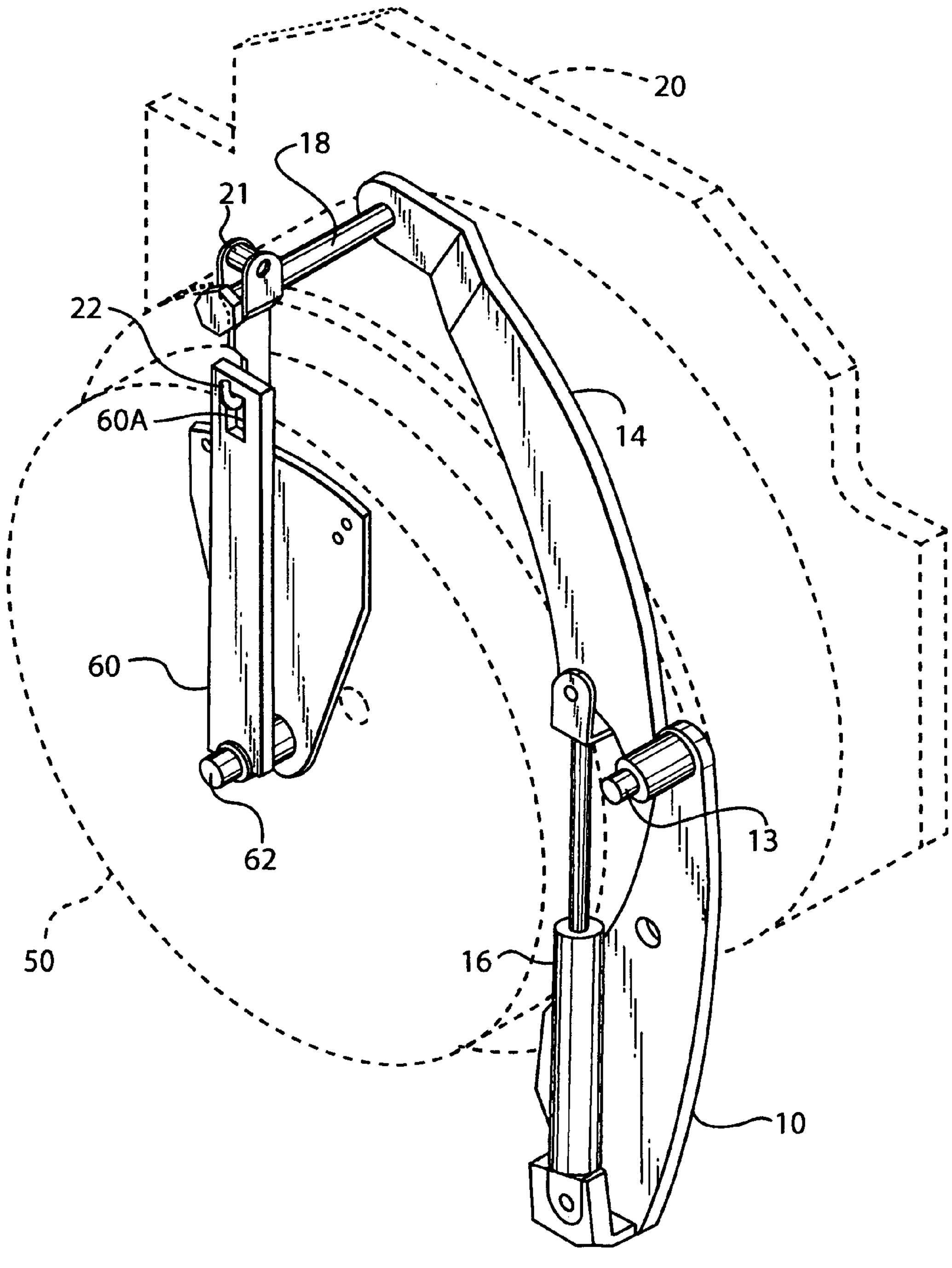
FIG. 5 is a perspective view of the lift tool being used to support a flywheel.

FIG. 5 illustrates the use of the lift tool for installing a flywheel 50 in a bell housing 20. For this type of installation, a different type of hanger bracket is used. Thus, hanger bracket 60 (having a slotted opening 60A in its upper end) is suspended from, and supported by, slide hook assembly 19 on rail 18. The lower end of the hanger bracket includes a pin or shaft which is perpendicular to the bracket for insertion into a central opening in the flywheel.

Figure 6A:
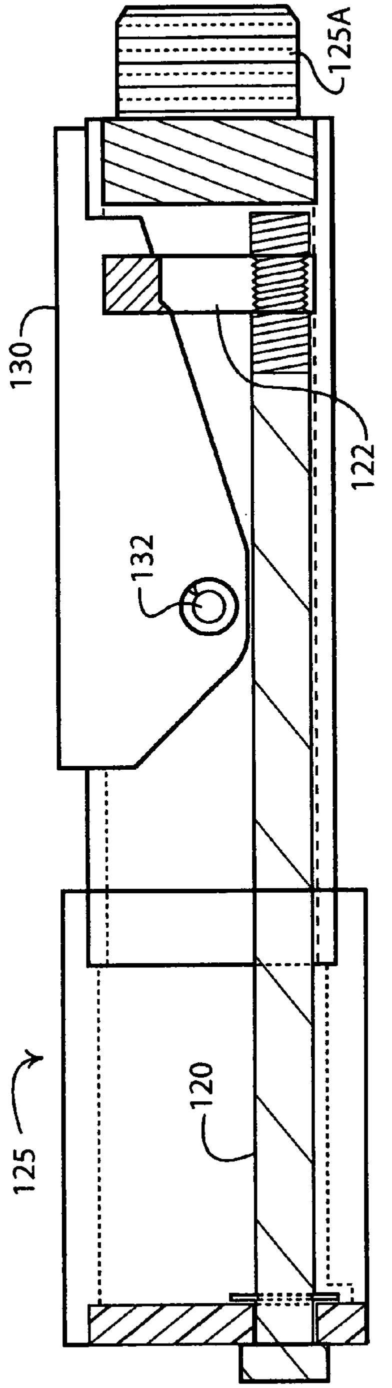
FIG. 6A and FIG. 6B are side elevational views of a preferred attachment device used to support a clutch assembly with the lift tool.
Figure 6B:
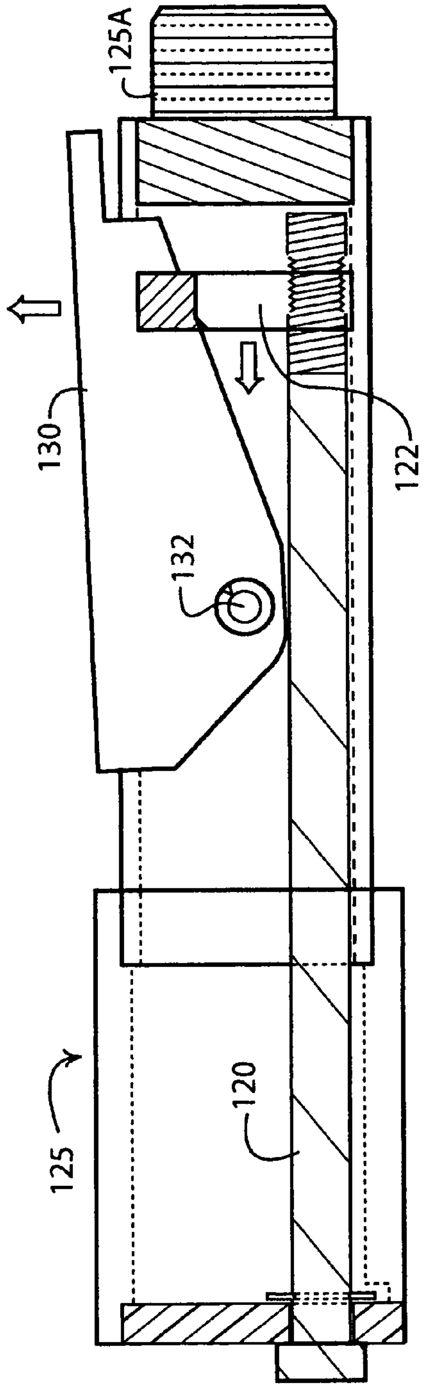

FIGS. 6A and 6B are side elevational views, partially cut-away, showing a preferred type of alignment tool 125 for use when lifting and supporting a clutch assembly with the system of this invention. The tool includes a plate or spline 130 which is pivotable about pin 132. An elongated threaded bolt 120 extends through a threaded opening in an actuator 122. When bolt 120 is rotated in one direction, it causes actuator 122 to move against one end of spline 130. This causes that particular end of the spline to be raised as it pivots about pin 132. This is illustrated in FIG. 6B. After this tool is inserted through the central opening in a clutch assembly, the bolt 120 is rotated so as to cause the outer end of spline 130 to be raised. This effectively secures and holds all of the components of the clutch together while they are being lifted and inserted into the bell housing. Then when this clutch assembly has been inserted into the bell housing, the bolt 120 can be rotated in the opposite direction to enable spline 130 to pivot back to its original position, thereby freeing the lift tool from the clutch assembly.

Other variants are possible without departing from the scope of this invention.

What is claimed is:

1. A method for installing a clutch assembly or flywheel in a bell housing of a vehicle, comprising the steps of:

(a) pivotably securing an elongated lift arm to said bell housing, wherein said elongated arm includes inner and outer ends, and wherein said outer end is adapted to pivot upwardly and downwardly about said inner end; and wherein said elongated arm further includes an elongated rail member secured to said outer end and projects outwardly therefrom;

(b) supporting a hook member on said rail member; wherein said hook member is moveable along said rail member;

(c) supporting a hanger bracket on said hook member;

(d) slidably engaging said hanger bracket into said clutch assembly or flywheel;

(e) raising said outer end of said elongated arm by way of power means to raise said hanger bracket and clutch assembly or flywheel to align said clutch assembly or flywheel with said bell housing; and (f) sliding said hook member and said hanger bracket along said rail member to position said clutch assembly or flywheel within said bell housing.

* * * * *